United States Patent
Serkh

(10) Patent No.: US 6,565,468 B2
(45) Date of Patent: *May 20, 2003

(54) TENSIONER WITH DAMPING MECHANISM

(75) Inventor: Alexander Serkh, Troy, MI (US)

(73) Assignee: The Gates Corporation, Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,052

(22) Filed: Dec. 21, 1999

(65) Prior Publication Data

US 2002/0032089 A1 Mar. 14, 2002

(51) Int. Cl.$^7$ ................................................ F16H 7/22
(52) U.S. Cl. ...................................................... 474/135
(58) Field of Search ................................ 474/133, 134, 474/135

(56) References Cited

U.S. PATENT DOCUMENTS

| | | | |
|---|---|---|---|
| 4,473,362 A | 9/1984 | Thomey et al. | 474/135 |
| 4,583,962 A | 4/1986 | Bytzek et al. | 474/133 |
| 4,689,037 A | 8/1987 | Bytzek | 474/135 |
| 4,698,049 A | 10/1987 | Bytzek et al. | 474/135 |
| 4,725,260 A | 2/1988 | Komorowski et al. | 474/135 |
| 4,816,012 A | 3/1989 | Bytzek | 474/135 |
| 4,824,421 A | 4/1989 | Komorowski | 474/135 |
| 4,886,484 A | 12/1989 | Hanes | 474/135 |
| 4,971,589 A | 11/1990 | Sidwell et al. | 474/135 |
| 4,973,292 A | 11/1990 | Mevissen | 474/192 |
| 5,139,463 A | 8/1992 | Bytzek et al. | 474/69 |
| 5,156,573 A | 10/1992 | Bytzek et al. | 474/74 |
| RE34,543 E | 2/1994 | Komorowski | 474/135 |
| RE34,616 E | 5/1994 | Komorowski et al. | 474/135 |
| 5,470,280 A | * 11/1995 | Ayukawa | 474/135 |
| 5,478,285 A | 12/1995 | Bakker et al. | 474/135 |
| 5,632,697 A | 5/1997 | Serkh | 474/109 |
| 5,647,813 A | 7/1997 | Serkh | 474/135 |
| 5,722,909 A | 3/1998 | Thomey | 474/87 |
| 5,919,107 A | 7/1999 | Stepniak | 474/112 |
| 5,964,574 A | 10/1999 | Serkh et al. | 474/109 |
| 5,967,919 A | * 10/1999 | Bakker | 474/94 |

FOREIGN PATENT DOCUMENTS

| | | | |
|---|---|---|---|
| DE | 198 43 943 A1 | 3/1999 | ............ F16H/7/08 |
| WO | 9928652 | 6/1999 | ..................... 7/12 |
| WO | 9928716 | 6/1999 | ..................... 1/22 |
| WO | 9947833 | 9/1999 | ..................... 7/12 |
| WO | 9947834 | 9/1999 | ..................... 7/12 |

* cited by examiner

Primary Examiner—David A. Bucci
Assistant Examiner—Vicky A. Johnson
(74) Attorney, Agent, or Firm—J. A. Thurnau, Esq.; C. H. Castleman, Esq.; S. G. Augustin, Esq.

(57) ABSTRACT

The invention comprises a tensioner that is particularly useful in micro-V front end accessory belt drive systems used in automotive applications where minimum tensioner bulk combined with maximum balancing and minimum pivot bushing wear in order to achieve maximum pulley alignment over the expected life of the tensioner. The belt tensioner of the invention is of the type with a base. A pivot-arm is attached to a cylindrical member that supports the pivot-arm and rotates about a pivot secured to the base. At least one sleeve-type bushing is positioned on the pivot and includes a bearing surface that supports the cylindrical member. A pulley is attached to the pivot-arm for engaging the belt and receives a belt load that generates a belt force component that is transmitted to the cylindrical member (hub load) A torsion spring having one end connected to the base and another end interconnected to a damping means generates a damping force component acting in the opposite direction as the belt force component. The damping means is mounted substantially between the pivot-arm and the bushing along a plane parallel with the pivot.

3 Claims, 3 Drawing Sheets

TENSIONER WITH DAMPING MECHANISM

BACKGROUND OF THE INVENTION

The invention relates to a belt drive system having a tensioner with a damping mechanism. More particularly, the invention relates to a tensioner with a torsion spring that biases the position of a pivot-arm to which a belt engaging pulley is rotatably mounted. The tensioner of the invention with its damping mechanism is particularly useful in controlling tension of a micro-V belt of a front end accessory drive for automotive engine applications.

A mechanical tensioner is used to automatically control the tension of a belt of a front end accessory drive for automotive engine applications. Such a tensioner has a pivot-arm that rotates about a pivot secured to a base and uses a sleeve-bushing on the pivot to provide a bearing surface for the rotating pivot-arm. Many of such bushings are made of plastic and are subject to wear over the expected life of the tensioner. A torsion spring is often used with one end connected to the pivot-arm and the other end interconnected through the base to bias the position of the pivot-arm and position an attached pulley against a belt. The spring is also used to generate a spring force operative with a damping means that generates a normal force component to a friction sliding surface to inhibit or dampen oscillatory movements of the pivot-arm.

One such tensioner is disclosed in U.S. Pat. No. 4,473,362. The '362 tensioner has a pivot-arm attached to an off-set cylindrical member that supports the pivot-arm and rotates about a pivot secured to a base. Only one torsion spring is used with one end connected to the pivot-arm and the other end connected to the base. A single sleeve-type bushing on the pivot has a bearing surface that supports the cylindrical member. The radial plane of a pulley bearing is off-set in relation to the sleeve-type bushing which introduces a moment or couple as a load which must be carried by the bushing. Such tensioners are sometimes referred as "Zed" type tensioners because of the off-set of the pulley relative to its support or base structure. Unequal pressure loads introduced into bearing surfaces of the bushing can result in excessive bushing wear and attendant pulley misalignment.

The belt of a drive system utilizing such Zed type tensioners engages the pulley and generates a belt force at the pulley which is transmitted to the cylindrical member (hereinafter hub load). As explained in the '362 patent, the unequal loads to the bushing are reduced by a damping means that generates a normal force component acting in generally the same direction as the hub load. Although the orientation of the belt force with the force component certainly alleviates some of the bushing load and attendant wear problems, it is lacking in some belt drive situations because the normal force component of the damping means is in some cases insufficient to balance against a moment generated by the belt force being off-set from the cylindrical member carrying the hub load, and the single bushing has a tendency to "bevel" or "crown" as bearing pressure loads change as the pivot-arm oscillates between clockwise and counter clockwise directions.

A belt tensioner design that solves the "bevel" or "crown" on the single bushing is disclosed in U.S. Pat. No. 5,647,813. As explained in the '813 patent, the hub load and normal force component generated by the damping mechanism are carried by at least one or two bushings having two axially spaced-apart bearing surfaces. However, while the '813 tensioner is a good design for solving bushing wear, the use of at least two axially spaced-apart bearing surfaces adds to the overall tensioner size, weight and cost. In addition, the hub load and the normal force component generated by the damping mechanism create a resultant load carried by the bushing which can be too large and cause excessive pivot bushing wear.

SUMMARY OF THE INVENTION

In accordance with the invention, a tensioner is provided that is particularly useful in micro-V front end accessory belt drive systems used in automotive applications where minimum tensioner bulk combined with maximum balancing and minimum pivot bushing wear in order to achieve maximum pulley alignment over the expected life of the tensioner is important. The belt tensioner of the invention is of the type with a base. A pivot-arm is attached to a cylindrical member that supports the pivot-arm and rotates about a pivot secured to the base. At least one sleeve-type bushing is positioned on the pivot and includes a bearing surface that supports the cylindrical member. A pulley is attached to the pivot-arm for engaging the belt and receives a belt load that generates a belt force component that is transmitted to the cylindrical member (hub load). A torsion spring having one end connected to the base and another end interconnected to a damping means generates a damping force component acting in the opposite direction as the belt force component. The damping means is mounted substantially between the pivot-arm and the bushing along a plane parallel with the pivot.

An advantage of the invention is that the hub load can be balanced more effectively with substantially less load on the pivot bushing and thereby improve durability. Another advantage of the invention is the reduced size of the bushing without increasing the pressure carried by the bushing and thereby the reduced bulk and cost of the entire tensioner.

These and other objects or advantages of the invention will be apparent after reviewing the drawings and description thereof wherein.

DESCRIPTION OF PREFERRED EMBODIMENTS

Figure 1:
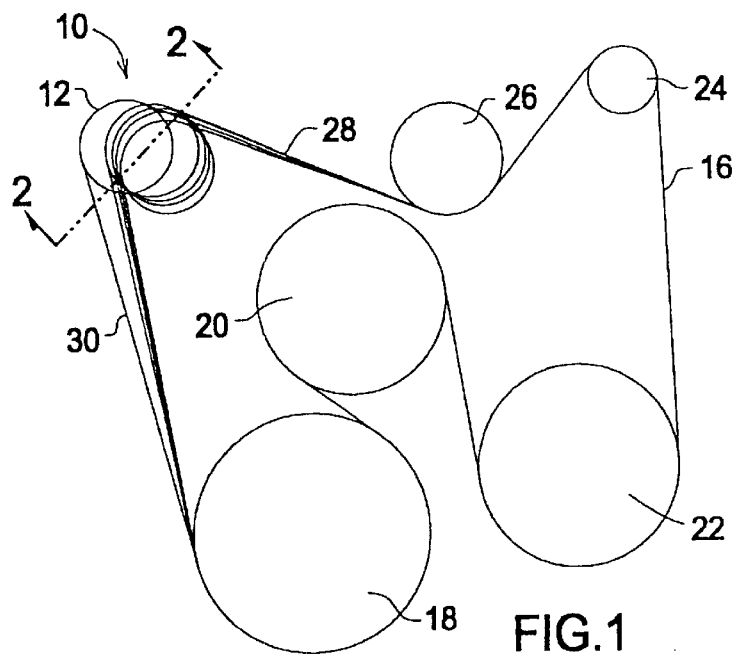
FIG. 1 is a front view schematic of a front end accessory drive system that includes a belt tensioner of the invention.
Figure 2:
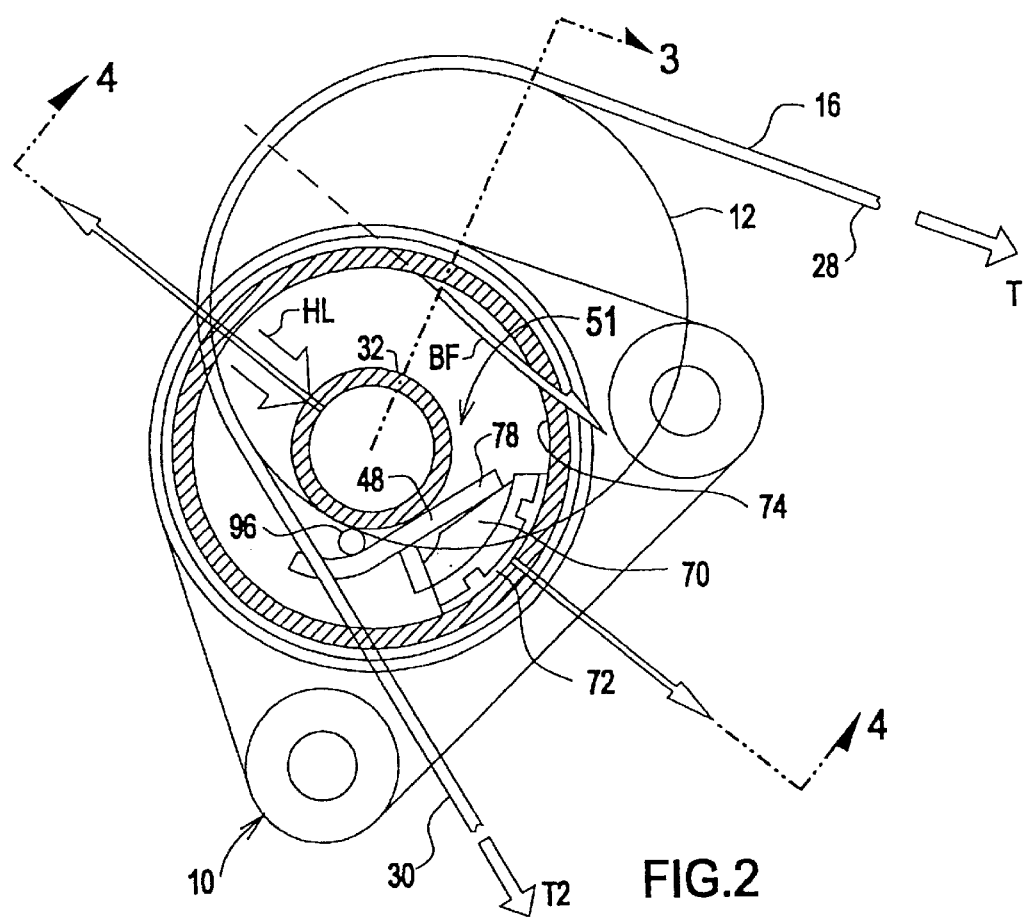
FIG. 2 is an enlarged partial schematic view taken generally at line 2 of FIG. 1 illustrating various component forces associated with the tensioner.

Referring to FIGS. 1 and 2, a tensioner 10 with a pulley 12 is illustrated as a component part of a belt drive system that includes a belt 16 and several pulleys. By way of example, the belt 16 is entrained around a crank pulley 18, a fan/water pump pulley 20, a power steering pulley 22, an alternator pulley 24, an idler pulley 26, and the tensioner pulley 12. The tensioner pulley 12 engages the belt 16 and is shown in several positions to schematically show how the pulley moves to adjust belt tension. The tensioner pulley 12 engages the belt 16 and receives a belt load in the form of belt tension T1, T2, of adjacent belt spans 28, 30. The belt tension T1, T2 (or load) combine to generate a belt force component BF along a bisector or an angle formed between the belt spans 28, 30. The belt force component being axially off-set from a pivot 32 of the tensioner, generates a complicated hub load including forces and moments that are symbolically (i.e. not specifically) represented by the arrow HL.

Figures 3, 4:
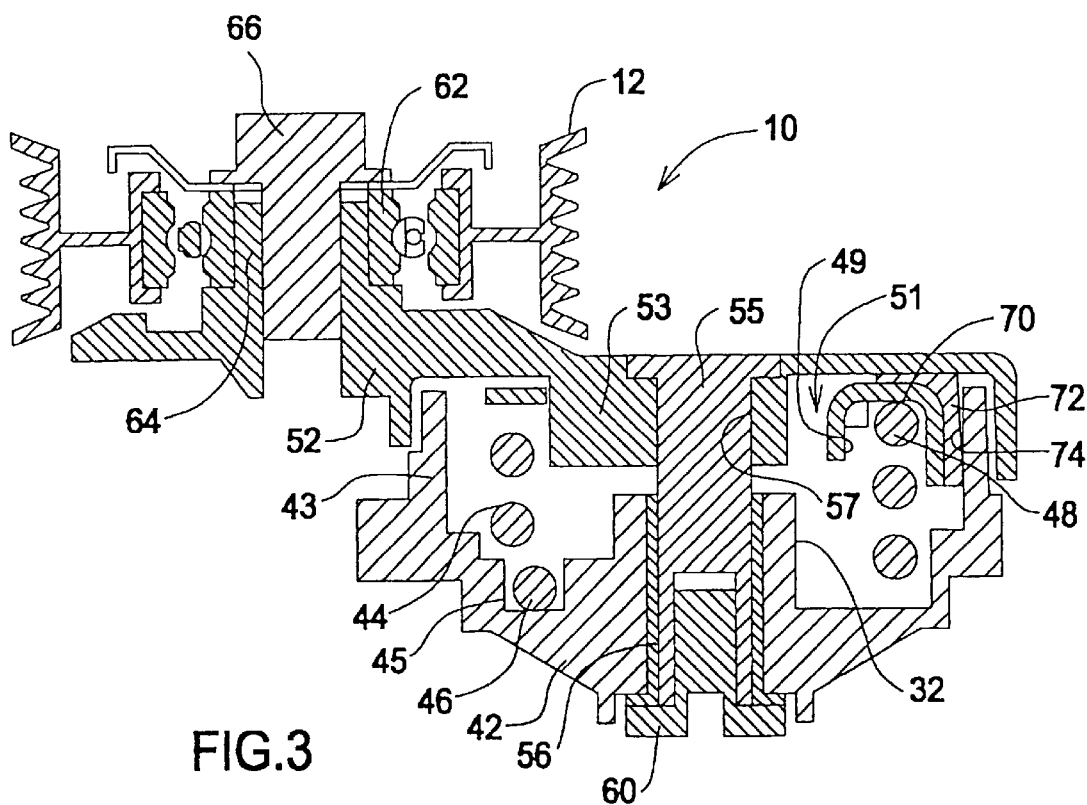
FIG. 3 is a cross-sectional view taken along line 3—3 of FIG. 2 except for the pulley which is shown in a quarter cross-section.
FIG. 4 is an enlarged broken away view generally along the line 4—4 of FIG. 3 and showing a damping mechanism of the invention.

Referring the FIGS. 2–4, the tensioner 10 is of the mechanical type and includes a base 42, a torsion spring 44 and a pulley 12 rotatably mounted to a pivot-arm 52 such as by means of a ball bearing 62 on a shaft 64. The ball bearing 62 is retained on the shaft 64 by a flanged fastener 66. The pivot-arm 52 is attached to a cylindrical member 53 that supports the pivot-arm 52 and rotates about a pivot shaft 55. At least one sleeve type bushing 56 is positioned in the pivot 32. The pivot bushing 56 is preferably of the polymeric type and positioned in the pivot for rotating against the pivot shaft 55 to thereby support the pivot-arm 52. While one pivot bushing 56 is represented, it is possible to have more than one pivot bushing. The pivot shaft 55 including a fastener 60, extends through a flanged bore 57 in the cylindrical member 53 and the pivot bushing 56 to thereby attach the pivot-arm 52 to the base 42.

The damping means 51, as shown, is exemplary of the type disclosed in U.S. Pat. No. 5,647,813 the disclosure of which is hereby incorporated by reference into the present specification. The damping means 51 is a mechanism that includes an extension 78 of spring end 48, a brake shoe 70 with an outside arcuate friction surface 72 that engages a complimentary inside arcuate surface 74 of the base 42. The brake shoe 70 has oppositely facing, inside ramp surfaces 86, 88 with a space intercept at an apex angle A.

The end of spring 48 that interconnects through the damping means 51 bends around a protuberance 96 formed of the pivot-arm 52 or attached to the pivot-arm 52. The extension 58 of the spring end has a surface 98 that slidingly engages inside ramp Surface 86 formed of the brake shoe 70. The pivot-arm 52 includes a protuberance 100 formed of the pivot-arm 52 or attached to the pivot-arm 52 and which has a complementary ramp surface 102 that slidingly engages the ramp surface 88 formed of the brake shoe 70.

The damping means 51 is mounted substantially between the pulley 12 and a pivot bushing 56 along a plane parallel with the pivot 32.

The cylindrical member 53 of the pivot-arm 52 is co-axial with the base 42 and together with the base 42 provides a housing for the torsion spring 44 and the damping means 51. The pivot-arm 52 extends over a first end 43 of the base 42. In some applications a dust seal (not shown) may be used to maintain a clean environment for the spring 44 and the damping means 51.

Figure 5:
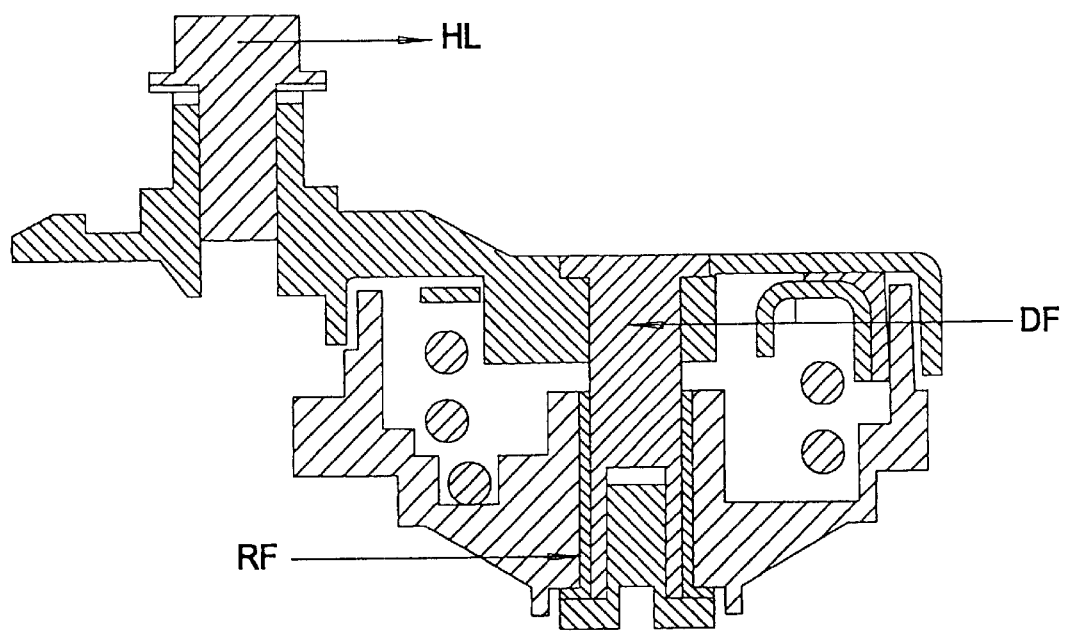
FIG. 5 is a schematic view taken along the line 3—3 of FIG. 2 with the pulley removed to illustrate force components associated with the invention.

Referring to FIG. 5, in operation, the pulley 12 attached to the pivot-arm 52 for engaging the belt 16 receives a belt load that generates a belt force component that is transmitted to the cylindrical member (hub load HL). The torsion spring 44 having one end 46 connected to the base 42 and another end 48 interconnected to the damping means 51 generates a damping force DF component acting in the opposite direction as the belt force component. Although it is not shown, it should be understood that the one end 46 may alternatively be connected to the arm 52 and another end 48 interconnected to the damping means 51. The hub load HL and the damping force DF generate a reaction force to the base 42 and carried by the bushing 56 which has a bearing surface and may be represented by RF. Since the damping means 51 is mounted substantially between the pulley 12 and the bushing 56, along a plane parallel with the pivot 32, the reaction force acts substantially on the bearing surface of the bushing 56.

What is claimed is:

1. A tensioner for tensioning a power transmission belt and of the type with a base; a pivot-arm attached to a cylindrical member that supports the pivot-arm and rotates about a pivot secured with the base; at least one sleeve-type bushing on the pivot and with a bearing, surface that supports the cylindrical member; a pulley attached to the pivot-arm for engaging the belt and receiving a belt load; a torsion spring with one end connected to a damping means that generates a damping force component acting in the opposite direction as a belt force component transmitted by the pivot-arm to the cylindrical member and wherein the improvement comprises;

the damping force component and the belt force component generate a reaction force component acting substantially on the bearing surface; and the damping means is disposed substantially between the arm and the bushing with respect to a pivot axis.

2. The tensioner as claimed in claim 1 wherein one end of the torsion spring is connected to the pivot-arm.

3. The tensioner as claimed in claim 1 wherein one end of the torsion spring is connected to the base.

* * * * *

UNITED STATES PATENT AND TRADEMARK OFFICE
CERTIFICATE OF CORRECTION

PATENT NO.   : 6,565,468 B2
DATED        : May 20, 2003
INVENTOR(S)  : Serkh, Alexander It is certified that error appears in the above-identified patent and that said Letters Patent is hereby corrected as shown below:

<u>Title page,</u>
Item [57], ABSTRACT,
Line 2, delete "micro-V" and replace it with -- Micro-V® --.

<u>Column 1,</u>
Line 11, delete "micro-V" and replace it with -- Micro-V® --.

<u>Column 2,</u>
Line 10, delete "micro-V" and replace it with -- Micro-V® --.

Signed and Sealed this

Second Day of September, 2003

JAMES E. ROGAN
*Director of the United States Patent and Trademark Office*